Aug. 5, 1952 D. H. JENNINGS 2,605,552
MASTER TOOLING DOCK
Filed Feb. 24, 1950 3 Sheets-Sheet 2
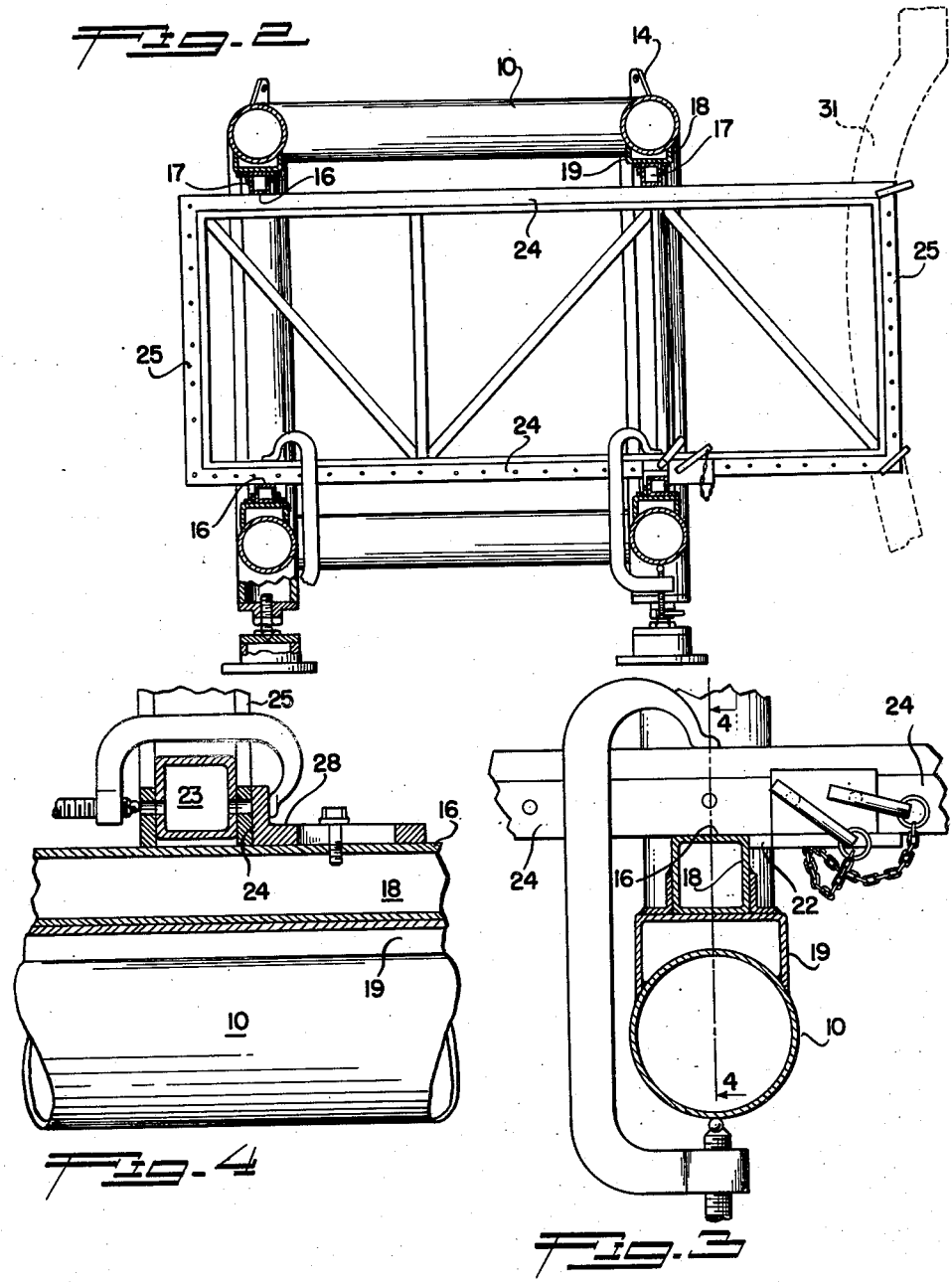
INVENTOR.
DOUGLAS H. JENNINGS
BY
*George C. Sullivan*
Agent Aug. 5, 1952 — D. H. JENNINGS — 2,605,552
MASTER TOOLING DOCK Filed Feb. 24, 1950 — 3 Sheets-Sheet 3

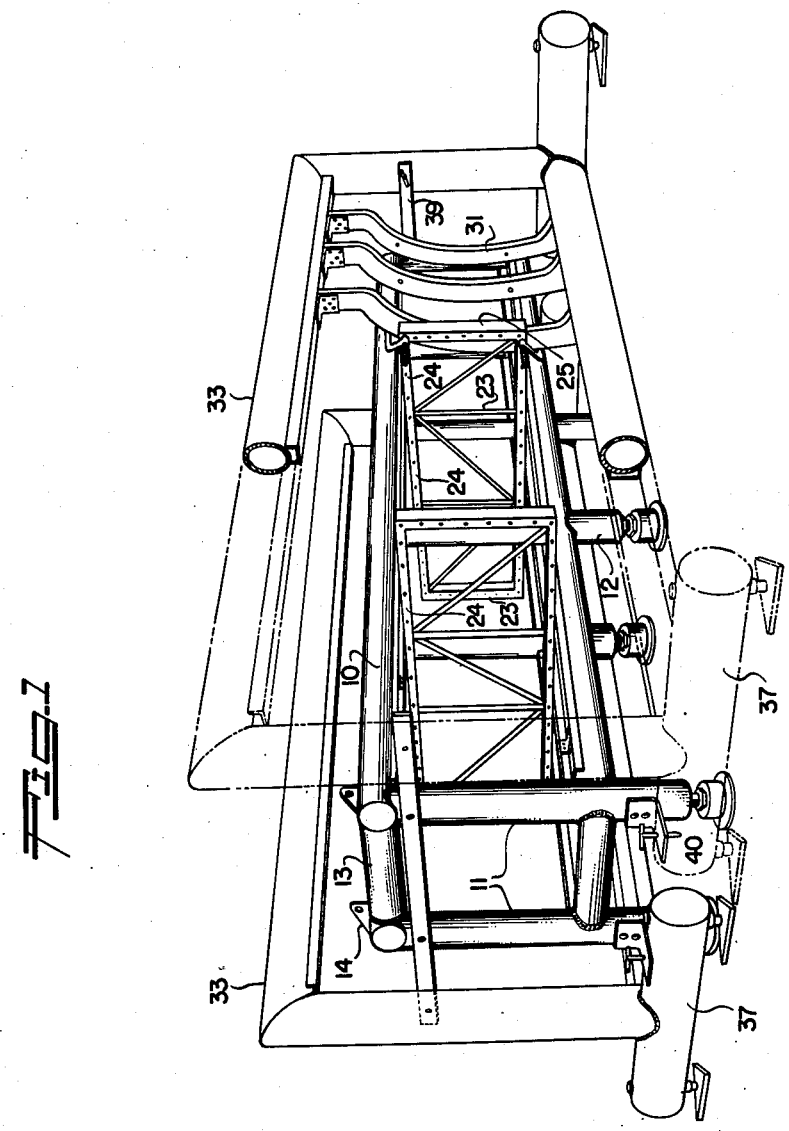

INVENTOR.
DOUGLAS H. JENNINGS
BY
George C. Sullivan
Agent

Patented Aug. 5, 1952

2,605,552

UNITED STATES PATENT OFFICE 2,605,552

MASTER TOOLING DOCK

Douglas H. Jennings, Burbank, Calif., assignor to Lockheed Aircraft Corporation, Burbank, Calif.

Application February 24, 1950, Serial No. 145,990

9 Claims. (Cl. 33—174)

This invention relates to a master tooling dock intended to accurately set up assembled fixtures or tooling for producing relatively large panels such as the wings and control surfaces or portions of the fuselage of an airplane.

Assembly jigs or fixtures for constructing complicated articles such as airplanes are ordinarily broken down into subassemblies to the extent justified by the prospective productive run, unless it is desired to avoid splices at critical stress points. For example, it may be worthwhile to build a monster fixture to produce a through or one-piece wing structure in sizes where available material permits, and in other cases to build right and left hand fixtures for wings and the like, and to build a fuselage of a plurality of lengthwise panels or sections to be later assembled with longitudinal seams. In the latter case the opposite sides of the fuselage may be members of the same curvatures, etc. differing only in the openings therein and in being right and left hand members of identical dimensions and opposite curvature at each station.

In the case of wings, fuselage panels, and the like, for example, the parts will have identical dimensions and opposite curvature and/or taper. In aircraft lofting practice it is standard practice to adapt uniformly spaced spanwise wing stations, and for the fuselage similar lengthwise stations; and to locate points or surfaces of intersections between the stations and spanwise or lengthwise butt (vertical) and waterline (horizontal) planes forming grids at each station. In order to accurately reproduce the loft lines it is necessary to be able to locate any desired point accurately with reference to each of the three planes defined by intersections of the station, butt, and waterline planes.

It is accordingly an object of this invention to provide an improved and simplified master tooling dock providing for the ready, accurate and reproduceable establishment of points and surfaces in each of the three planes with respect to a master tool or assembly jig or jigs temporarily aligned with either or both sides of the tooling dock; thus permitting the simultaneous alignment of templates and mounting provisions for bulkheads or ribs in either duplicate or right and left hand assembly jigs or fixtures, as in the case of identically dimensioned but opposite handed parts, such as wing sections. By setting up the jig frames on either side of the tooling dock, one setting for the desired station establishes the plane for the oppositely handed butt and waterline stations which, in turn, define points or template positions common to both of the fixtures under construction.

It is a further object of this invention to provide a compact and simplified tooling dock of the class described that is readily portable, enabling the dock to be set up along side the frame of an assembly jig or fixture adjacent the desired location of the latter. By arranging the tooling dock for operation alongside of one or between two tools, such as assembly jigs, the dock can be used to produce tools, jigs or fixtures larger than the dock itself as no limitations on tooling size are imposed by the necessity of building the tool within the confines of the tooling dock.

It is a further object of this invention to provide a tooling dock of the type described providing means for readily and accurately establishing points and lines in three intersecting planes, wherein two mutually perpendicular planes are defined by one or more truss or bridgelike members adjustably accurately positioned in selected planes normal to the longitudinal axis of the dock structure to define station locations therealong, the truss members being transversely adjustable at their selected stations to define butt lines and planes offset to either side of the dock structure.

Other objects and features of the invention will be readily understood from the following detailed description of typical preferred forms of the invention wherein reference will be made to the accompanying drawings in which:

Figure 1 is a perspective view of a tooling dock with assembly jig fixtures set up along either side thereof; one fixture being partly broken away to better disclose the tooling dock;

Figure 2 is a transverse vertical section through the tooling dock of Figure 1, showing the mounting of one of the transversely adjustable members;

Figure 3 is an enlarged fragmentary detail of Figure 2 to show the gaging for locating the truss member transversely of the tooling dock;

Figure 4 is an enlarged fragmentary detail on line 4—4 of Figure 3, showing the locating means for the longitudinal position of the truss member relative to the tooling dock.

Figure 5:
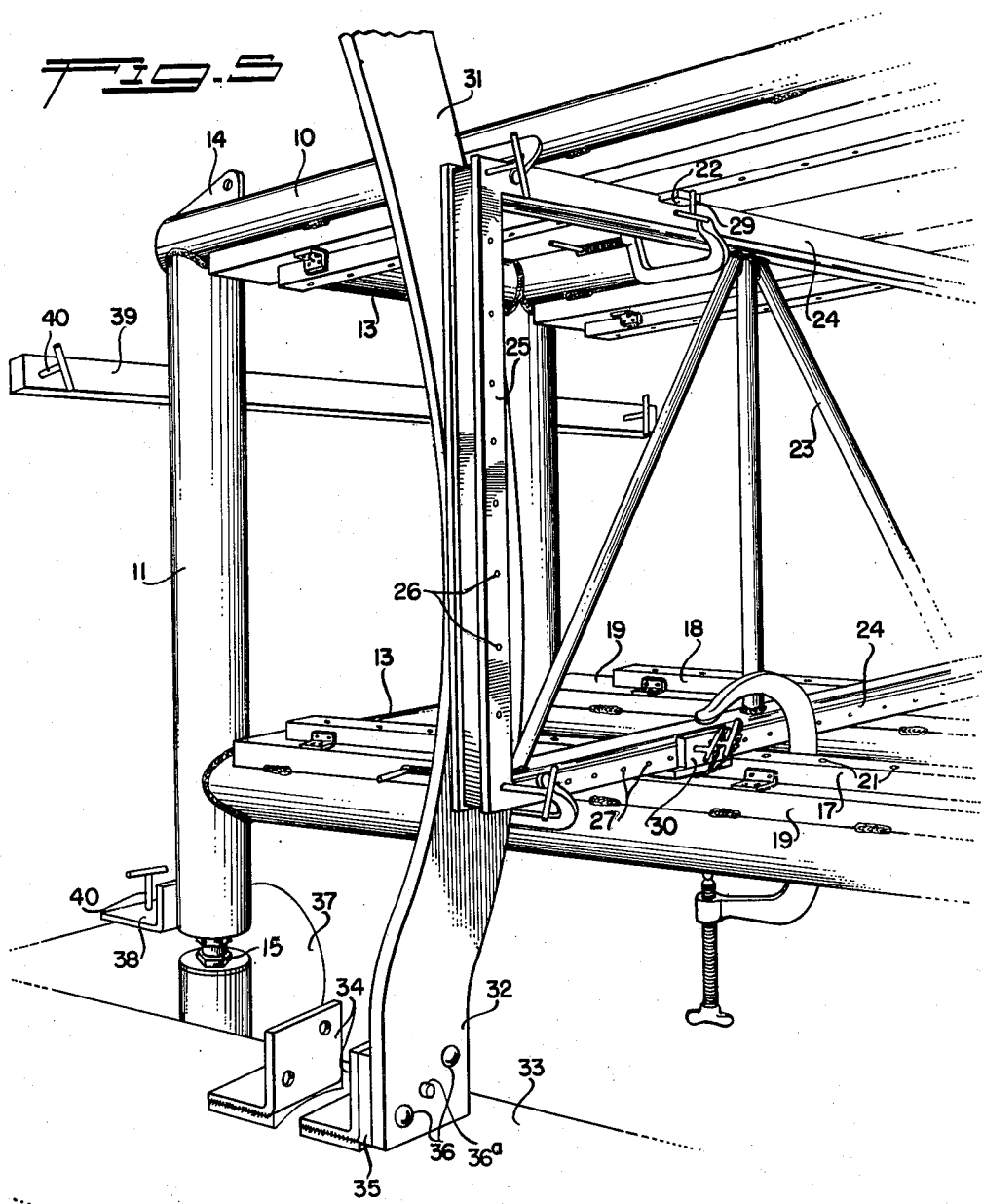
Figure 5 is an enlarged fragmentary perspective of a portion of the tooling dock and a truss member to show the method of locating a template member relative to its supporting assembly, fixture, or jig.

As shown on the drawings, the basic tooling dock supporting structure comprises four spaced parallel longitudinal steel tubes 10, the upper and lower pairs of which lie in common horizontal planes, and the two on each side lying in common vertical planes so that a cross-section thereof is square or rectangular. The ends of each side pair of tubes 10 are supported by legs 11, and one or more intermediate pairs of legs 12 break up the longitudinal tubes 10 into panels of spans short enough to prevent sagging of the tubes 10 as accessories are added thereto. Cross tubes 13 in the horizontal planes of the top and bottom longitudinal tubes 10 tie the structure together, and hoisting lugs 14 are provided at the top corners to facilitate transportation of the dock, as by cranes or derricks.

Each of the legs 11 and 12 are provided with adjustable feet 15 so that the dock may be accurately leveled and any intermediate sag in the tubes 10 taken out regardless of floor irregularities, no special or permanent foundation being required, since the dock is preferably set up adjacent the desired final location of any assembly jigs or fixtures to be built, rather than to transport the finished fixtures to the place of use; since such fixtures may be much larger, heavier and more easily damaged than the basic self-contained dock structure itself.

The foregoing description covers the basic structural frame of the tooling dock. This frame supports accurately positioned longitudinal vertical and horizontal straight edges 16 and 17 which are formed of square tubes 18 mounted on inverted channels 19 carried by the tubes 10, the lower pair of tubes 10 having the straight edge structures on their upper sides; and the upper tubes having them on their lower sides. The term "straight edges" is used for convenience, as actually the surface 16 of the box section 18 is carefully finished as a level plane surface and the surface 17 is carefully finished as a vertical plane surface; the intersection of these planes at a corner of the box section defining a theoretical straight edge, although the plane surfaces 16 and 17 are relied upon in taking measurements or setting up auxiliary equipment. The vertically opposed facing surfaces of the square tubes 18 on each side of the dock are accurately finished plane and parallel to form the straight edges 17. Thus finished surfaces define both vertical and horizontal plane surfaces at right angles to each other and in alignment with the corresponding surfaces of the adjacent corners of the square or rectangular cross-section defined by the four longitudinal straight edges 16 and 17.

The horizontal surfaces of the tubes 18 which form the straight edges 16 are each provided with a series of accurately located, uniformly spaced gage holes 21 in alignment in each of the four straight edges. While the spacing may be chosen to suit special circumstances, it is convenient to use ten inches, as this spacing corresponds to the usual loft station spacing from which the profiles of master sheet metal templates are determined in aircraft construction. In such practice, fuselage stations are spaced lengthwise of the fuselage and wing stations are spaced span-wise of the wing, starting from the centerline of the aircraft. Thus wing stations 200 would be 20 holes from that hole selected as the zero or centerline. Note that these holes 21 do not limit the location of templates and the like to such spacing, as it will appear from what follows that accurate measurements are made from a conveniently located hole rather than measuring from zero each time. Gage blocks 22 and/or other measuring tools allow very accurate measurements in locating any specified point between the holes 21.

In aircraft and boat building practice the cross-section of the fuselage or hull, for example, is defined by spaced horizontal planes extending lengthwise of the article, which planes are called waterlines; and spaced vertical planes also extending lengthwise and called butt lines in aircraft practice and buttock lines in boat building. Thus a cross-section of the article can have its outline or envelope accurately defined by the intersections thereof with the various water and butt lines, or the distances along one of either type of lines from a specified intersection thereof.

The present invention provides a rectangular truss or bridge-like member generally indicated by the numeral 23, which is intended to be vertically disposed between and set accurately normal across the longitudinal straight edges 16. This truss member supports horizontal top and bottom straight edges 24 and vertical end straight edges 25, corresponding respectively to waterlines and butt lines. The several waterlines are defined by a series of uniformly spaced gage holes 26 in the vertical straight edges; and the several butt lines are defined by sidewise shifting of the truss member located by a series of gage holes 27 in the horizontal straight edges, which latter holes 27 are used to define the bodily shift of the truss member 23 relative to the vertical straight edges 17 on the tubes 10.

The truss members 23 may be located at any desired stations along the straight edges 16 of the tubes 10 and then shifted sideways either way to define right or left butt lines with reference to the center line of the article. To facilitate the station location of the truss member, angles 28 (F4) may be bolted to the straight edges 16 and accurately located from adjacent selected gage holes 21 as by interposing gage blocks between a gage pin 29 in the selected holes 21 and the working face of the angle. The truss member 23 is then positioned against the working face of the angle and its cross-wise position determined by using a gage block 22 positioned between the straight edge 17 and a channel member 30 pinned to the lower straight edge 24 by gage pins 29 (Figure 3). With the station and butt line locations thus accurately determined or set up, any two of the gage holes 26 in the projecting vertical straight edge 25 may be selected as master locating or dowel holes for mounting a template 31 thereon. A number of templates 31 are commonly required in constructing an assembly fixture, each of which is designed for a particular station. These templates do not necessarily conform to the outline or surface of the article to be constructed but are primarily provided with means (not shown) for supporting ribs or skin reinforcing or supporting members when constructing wings, and equivalent parts when constructing sections of fuselage.

These templates 31 are provided with top and bottom extensions 32 for mounting them in a supporting rigid framework 33, sometimes called a picture frame, which is usually of such a size as to support the templates at a convenient working height. A convenient mounting is provided by roughly positioned angles 34 welded to the frame 33 with a spacer 35 of low temperature alloy cast in position between the angles and the foot 32 of the template. Bolts 36 and dowels 36ª then hold the assembly together. The framework 33 with the templates 31 rigidly secured thereto, forms an assembly jig, and the principal purpose of the tooling dock of this invention is to accurately and reproduceably position the templates relative to each other and to the stations, water, and butt lines, as originally laid out during the lofting procedure.

The jig framework 33 is supplied with its own mounting legs 37 and is initially positioned along one side of the dock and tied thereto by brackets 38 and cross ties 39 at both ends, the brackets and cross ties being rigid with the dock but engaged with the framework 33 by closely fitted pins 40 which can be rotated by hand while the alignment of the framework 33 relative to the dock remains unchanged. Accordingly, any misalignment due to movement, settling, or warpage, will bind the pins 40 thus warning of misalignment. In practice, the dock may be used over a period of months to build a single or pair of complicated assembly jigs, so that weather changes, and the like call for daily checks of the pins 40 to assure continued alignment.

In the use of the improved tooling dock of this invention the basic structure thereof is normally transported to the intended general location of the jigs or fixtures to be built, being conveniently handled by a crane or mobile derrick. The dock straight edges 16 are then leveled both lengthwise and cross-wise by suitable adjustment of the feet 15; and the straight edges 17 also checked for straightness or alignment throughout the length of the dock. Thereafter the prepared jig framework 33 is set up alongside of the tooling dock. If right and left hand or duplicate jigs or fixtures are required they can be set up on opposite sides of the dock. It is not necessary that the jig or fixture frameworks 33 be set up vertically, as the jig fittings or templates can be set up in an inclined jig framework so that they will be conveniently positioned for subsequent ease of assembly work on the article to be produced. Also if duplicate fixtures are to be built one of the frames 33 can be aligned with the dock in an upside down position to utilize the same station locations along the dock when working on both sides thereof. The brackets 38 and cross-ties 39 are then secured to the dock and engaged to the jig framework by the pins 40.

In order to speed up the jig or fixture building, several truss members 23 can be mounted at different stations along the dock for separately aligning several templates 31 for mounting in the jig or fixture framework 33. When right and left hand or duplicate assembly jigs or fixtures are worked on simultaneously, one or more of the truss members may be set to project from one side of the dock to work on one of the fixtures, and one or more of the truss members may project out of the other side of the dock to work on the other fixture. As soon as one truss member has located its template 31 in one of the fixtures it can be slid over to the other side of the dock, using the same station set up in the dock, to work on the corresponding template in the other fixture 33. This arrangement allows several teams of fixture builders to work simultaneously at different positions along one or both jigs or fixtures and greatly shortens the time required to produce the finished assembly jig or fixture.

It will thus be seen that I have invented an improved and simplified tooling dock that can be used to simultaneously build right and left hand or duplicate assembly jigs or fixtures; the dock being capable of use in producing fixtures of much greater dimensions than those of the dock itself.

Having described only typical forms of the invention I do not wish to be limited to the specific details herein set forth, but wish to reserve to myself any variations or modifications that may appear to those skilled in the art and fall within the scope of the following claims.

I claim:

1. A tooling dock of the class described, comprising a rigid framework of four parallel spaced horizontal tubular members forming a boxlike section, parallel straight edges carried by each of said tubular members and so positioned on said tubular members that the four parallel straight edges define vertical and horizontal planes at right angles to each other, at least one rectangular truss member adjustably mounted at a selected station between and across said straight edges in a plane normal to the planes defined by said straight edges, and means for accurately positioning said truss member lengthwise and cross-wise of said straight edges.

2. A tooling dock of the class described, comprising a rigid framework of four parallel spaced horizontal tubular members forming a boxlike section, parallel straight edges carried by each of said tubular members and so positioned on said tubular members that the four parallel straight edges define vertical and horizontal planes at right angles to each other, station indicia formed in said straight edges, at least one rectangular truss member adjustably mounted at a selected station between and across said straight edges in a plane normal to the planes defined by said straight edges, and means for accurately positioning said truss member lengthwise and cross-wise of said straight edges.

3. A tooling dock of the class described comprising a rigid framework of four parallel spaced horizontal tubular members forming a boxlike section, parallel straight edges carried by each of said tubular members and so positioned on said tubular members that the four parallel straight edges define vertical and horizontal planes at right angles to each other, at least one rectangular truss member adjustably mounted at a selected station between and across said straight edges in a plane normal to the planes defined by said straight edges, means for accurately locating the plane of said truss member the related position transverse to said straight edges, and means for accurately locating the sideways position of said truss member in the plane established by said last mentioned means.

4. A tooling dock of the class described, comprising a rigid horizontal frame having spaced longitudinal parallel members defining a rectangular section, straight edge forming means secured to each of said members and so disposed thereon as to face each other between adjacent vertically spaced members defining the sides of the rectangular section, said means being finished on their facing surfaces to form parallel horizontal planes common to both sides of the rectangular section, said means being further finished on their outside surfaces to form parallel vertical planes common to both the top and bottom sides of the rectangular section, and a transverse truss member of rectangular form at least one side of which defines a plane surface and arranged to be selectively positioned between the horizontal planes formed on said means in a vertical plane normal to the planes defined by the finished surfaces of said means.

5. A tooling dock of the class described, comprising a rigid horizontal frame having spaced longitudinal parallel members defining a rectangular section, straight edge forming means secured to each of said members and so disposed thereon as to face each other between adjacent vertically spaced members defining the sides of the rectangular section, said means being finished on their facing surfaces to form parallel horizontal planes common to both sides of the rectangular section, said means being further finished on their outside surfaces to form parallel vertical planes common to both the top and bottom sides of the rectangular section, a transverse truss member of rectangular form at least one side of which defines a plane surface and arranged to be selectively positioned between the horizontal planes formed on said means in a vertical plane normal to the planes defined by the finished surfaces of said means, and mounting means for accurately locating said truss member at a specified location along said means.

6. A tooling dock of the class described, comprising a rigid horizontal frame having spaced longitudinal parallel members defining a rectangular section, straight edge forming means secured to each of said members and so disposed thereon as to face each other between adjacent vertically spaced members defining the sides of the rectangular section, said means being finished on their facing surfaces to form parallel horizontal planes common to both sides of the rectangular section, said means being further finished on their outside surfaces to form parallel vertical planes common to both the top and bottom sides of the rectangular section, a transverse truss member of rectangular form at least one side of which defines a plane surface and arranged to be selectively positioned between the horizontal planes formed on said means in a vertical plane normal to the planes defined by the finished surfaces of said means, and mounting means for accurately locating said truss member relative to the vertical planes defined by said means.

7. A tooling dock of the class described, comprising a rigid horizontal frame having spaced longitudinal parallel members defining a rectangular section, straight edge forming means secured to each of said members and so disposed thereon as to face each other between adjacent vertically spaced members defining the sides of the rectangular section, said means being finished on their facing surfaces to form parallel horizontal planes common to both sides of the rectangular section, said means being further finished on their outside surfaces to form parallel vertical planes common to both the top and bottom sides of the rectangular section, a transverse truss member of rectangular form at least one side of which defines a plane surface and arranged to be selectively positioned between the horizontal planes formed on said means in a vertical plane normal to the plane defined by the finished surfaces of said means, mounting means for accurately locating said truss member at a specified location along said means, and mounting means for accurately locating said truss member relative to the vertical planes defined by said means.

8. A tooling dock of the class described, comprising spaced parallel structural members forming a relatively long open box of rectangular section, straight edged members mounted on said structural members to define spaced parallel horizontal and vertical planes throughout the length of the dock, and a transverse rectangular truss like member formed to define a plane surface adjustably positioned between the horizontal planes defined by said straight edge members, said truss like member being adjustable transversely relative to the vertical planes defined by said straight edged members.

9. A tooling dock of the class described, comprising spaced parallel structural members forming a relatively long open box of rectangular section, straight edged members mounted on said structural members to define spaced parallel horizontal and vertical planes throughout the length of the dock, and a transverse rectangular truss like member formed to define a plane surface adjustably positioned between the horizontal planes defined by said straight edge members, said truss like member being adjustable transversely relative to the vertical planes defined by said straight edged members, and station, water and butt line indicia formed in said straight edge members and said truss like member whereby to facilitate the longitudinal and transverse adjustments of the truss like member.

DOUGLAS H. JENNINGS.

REFERENCES CITED

The following references are of record in the file of this patent:

UNITED STATES PATENTS

| Number | Name | Date |
|---|---|---|
| 966,801 | Daisley | Aug. 9, 1910 |
| 1,949,007 | Butler | Feb. 27, 1934 |
| 2,433,889 | Bryant | Jan. 6, 1948 |

OTHER REFERENCES

American Machinist, page 122, June 7, 1945.